(12) United States Patent
Umeda (10) Patent No.: US 6,738,271 B2
(45) Date of Patent: May 18, 2004

(54) CHARGE PUMP CIRCUIT DC/DC CONVERTER AND POWER SUPPLY APPARATUS FOR LIQUID CRYSTAL DEVICE

(75) Inventor: Hiroyuki Umeda, Suwa (JP)

(73) Assignee: Seiko Epson Corporation (JP)

( * ) Notice: Subject to any disclaimer, the term of this patent is extended or adjusted under 35 U.S.C. 154(b) by 131 days.

(21) Appl. No.: 10/068,774

(22) Filed: Feb. 6, 2002

(65) Prior Publication Data

US 2002/0110009 A1 Aug. 15, 2002

(30) Foreign Application Priority Data

Feb. 7, 2001 (JP) ..................... 2001-030896

(51) Int. Cl.⁷ ............................... H02M 7/19
(52) U.S. Cl. ...................... 363/60; 327/536
(58) Field of Search ............. 363/59, 60; 327/142, 327/143, 530, 534–538, 540

(56) References Cited

U.S. PATENT DOCUMENTS 5,767,735 A * 6/1998 Javanifard et al. .......... 327/536
6,020,781 A * 2/2000 Fujioka ....................... 327/541
6,128,242 A * 10/2000 Banba et al. ................ 365/226
6,282,108 B1 * 8/2001 Yang ............................ 363/60
6,556,066 B2 * 4/2003 Sato ............................ 327/536

* cited by examiner

*Primary Examiner*—Michael Sherry
*Assistant Examiner*—Gary L. Laxton
(74) *Attorney, Agent, or Firm*—Harness, Dickey & Pierce, P.L.C.

(57) ABSTRACT

A first charge pump circuit and a second charge pump circuit are complementarily driven by a first driving circuit and a second driving circuit, and step up a DC input voltage by two times. Also, the first driving circuit stops its operation based on a light load judging signal, an input voltage judging signal or an output voltage judging signal, which is input in a control input terminal. For example, when the load is light, there is a margin for the load, and the light load judging signal becomes to be an "L" level. As a result, the first driving circuit stops outputting drive signals, such that the first charge pump circuit stops its operation.

20 Claims, 7 Drawing Sheets

Prior Art

CHARGE PUMP CIRCUIT DC/DC CONVERTER AND POWER SUPPLY APPARATUS FOR LIQUID CRYSTAL DEVICE

Japanese Patent Application No. 2001-30896, filed on Feb. 7, 2001, is hereby incorporated by reference in its entirety.

BACKGROUND OF THE INVENTION

The present invention relates to a charge pump type DC/DC converter and a power supply apparatus for liquid crystal devices using the same.

Figure 6:
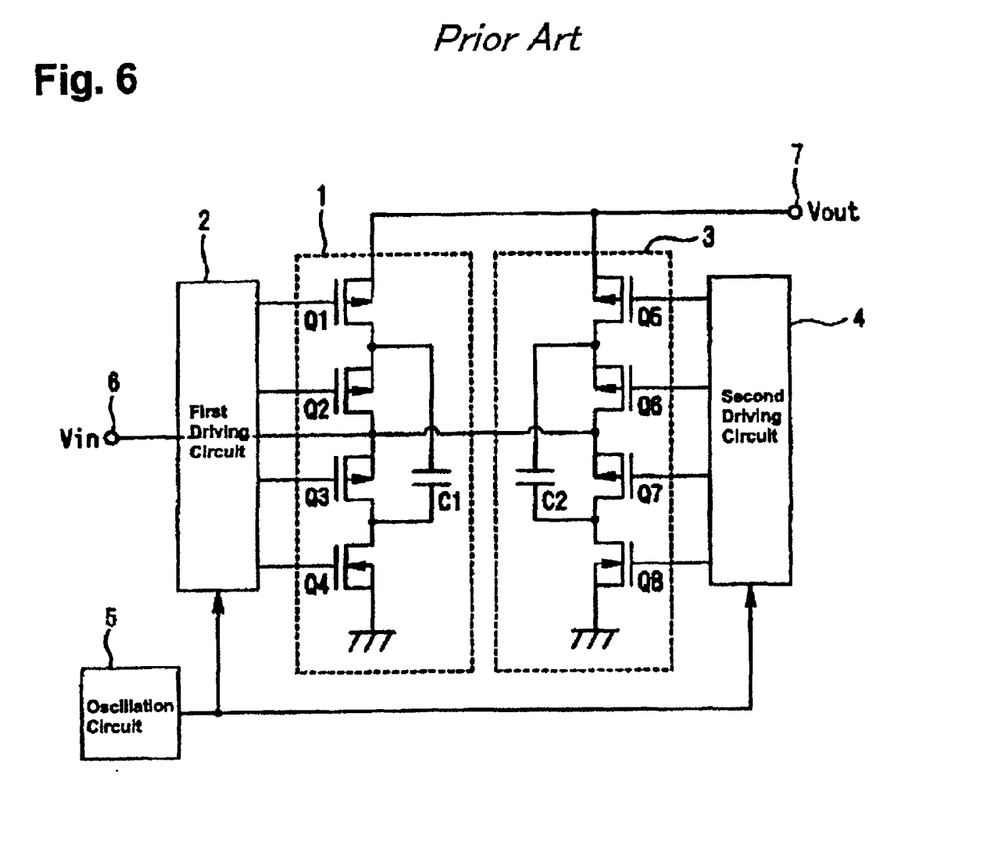
FIG. 6 shows a circuit diagram of a conventional DC/DC converter.

As a conventional charge pump DC/DC converter (hereafter referred to as a first conventional apparatus), a double step-up complementary driving type shown in FIG. 6 is known.

The first conventional apparatus is equipped with, as shown in FIG. 6, a double step-up first charge pump circuit 1, a first driving circuit 2 that drives the first charge pump circuit 1, a double step-up second charge pump circuit 3, a second driving circuit 4 that drives the second charge pump circuit 3, an oscillation circuit 5 that oscillates a signal to be provided to the first driving circuit 2 and the second driving circuit 4, an input terminal 6 and an output terminal 7.

The first charge pump circuit 1 is formed from MOS transistors Q1 to Q4 and a capacitor C1. Also, the second charge pump circuit 12A is formed from switching MOS transistors Q5 to Q8 and a capacitor C2, Next, operations of the first conventional apparatus having the structure described above are described with reference to FIG. 6 and FIGS. 7A and 7B.

Figure 7A:
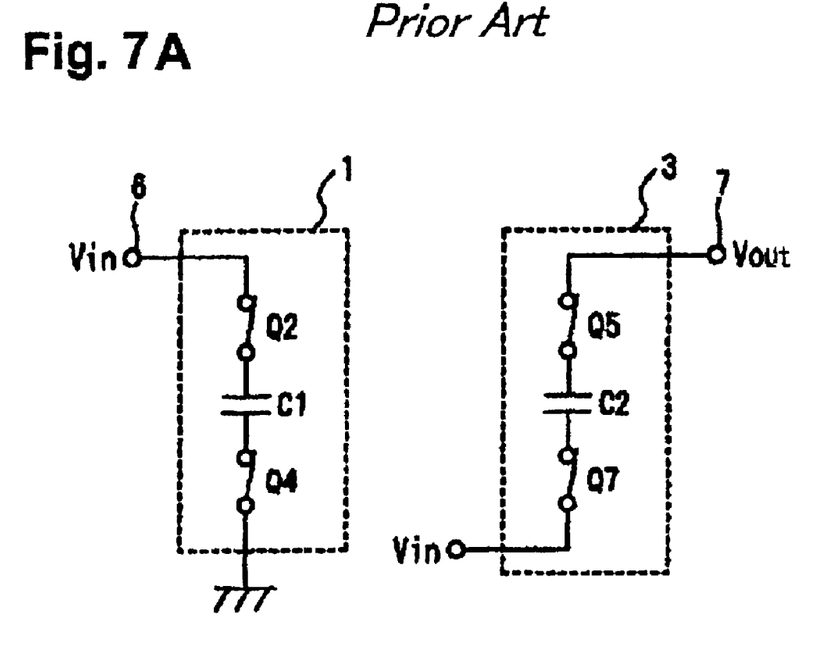
FIGS. 7A and 7B show operations of the DC/DC converter shown in FIG. 6.
Figure 7B:
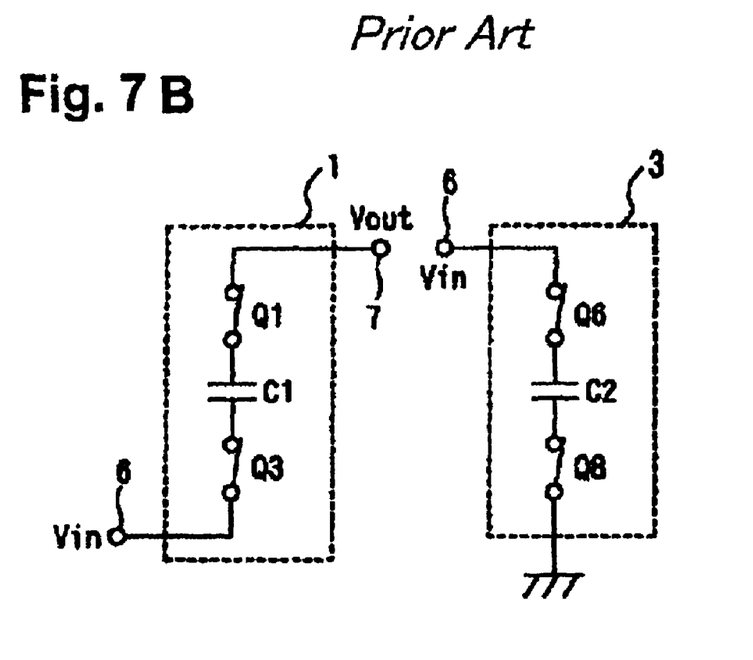

In the first conventional apparatus, the first and second charge pump circuits 1 and 3 are placed in a state shown in FIG. 7A in a first period, and in a state shown in FIG. 7B in a second period. The operations in the first period and the second period are alternately repeated.

In other words, in the first period, in the first charge pump circuit 1, only the MOS transistors Q2 and Q4 are turned on by the first driving circuit 2, and the capacitor C1 is charged with an input DC voltage Vin (see FIG. 7A).

Also, in the same first period, in the second charge pump circuit 3, only the MOS transistors Q5 and Q7 are turned on by the second driving circuit 4, and a voltage in which a charged voltage of the capacitor C2 in the second period in a previous round is added to an input DC voltage Vin becomes to be an output DC voltage Vout (see FIG. 7A).

In contrast, in the second period, in the first charge pump circuit 1, only the MOS transistors Q1 and Q3 are turned on by the first driving circuit 2, and a voltage in which a charged voltage of the capacitor C1 in the first period in a previous round is added to an input DC voltage Vin becomes to be an output DC voltage Vout (see FIG. 7B).

Also, in the same second period, in the second charge pump circuit 3, only the MOS transistors Q6 and Q8 are turned on by the second driving circuit 4, and the capacitor C2 is charged with an input DC voltage Vin (see FIG. 7B).

Figure 8:
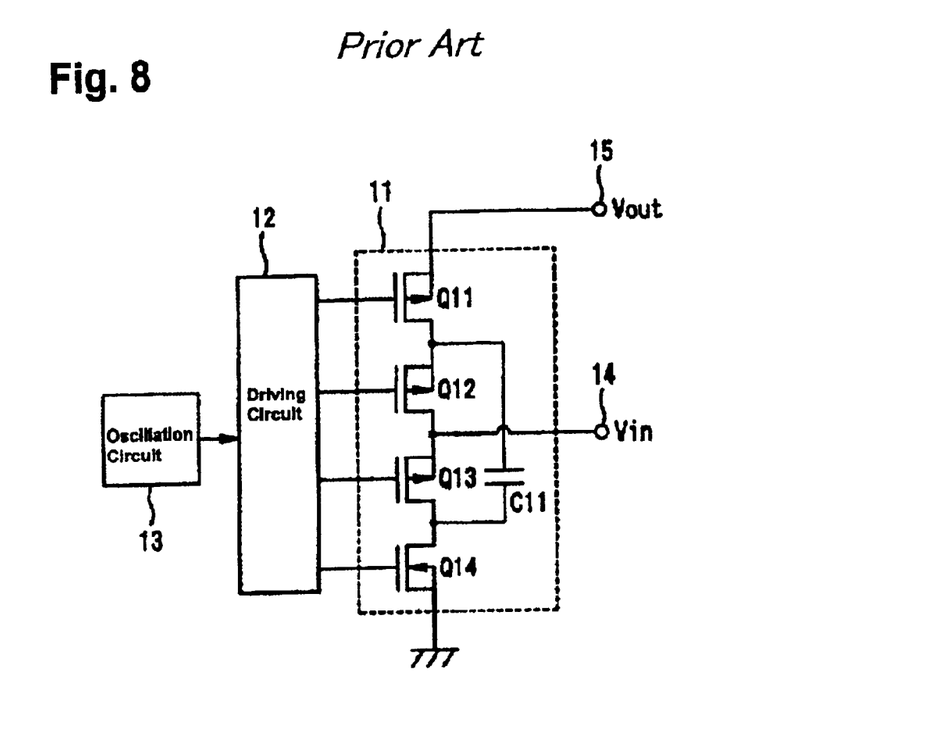
FIG. 8 shows a circuit diagram of another conventional DC/DC converter.

Meanwhile, as a second example of a conventional charge pump DC/DC converter (hereafter referred to as a second conventional apparatus), a type shown in FIG. 8 is known.

The second conventional apparatus is equipped with, as shown in FIG. 8, a charge pump circuit 11, a driving circuit 12 that drives the charge pump circuit 11, an oscillator 13 that oscillates a specified signal to be supplied to the driving circuit 12, an input terminal 14 and an output terminal 15.

The charge pump circuit 11 is formed from MOS transistors Q11 to Q14, and a capacitor C11.

Next, operations of the second conventional apparatus having the structure described above are described with reference to FIG. 8 and FIGS. 9A and 9B.

Figure 9A:
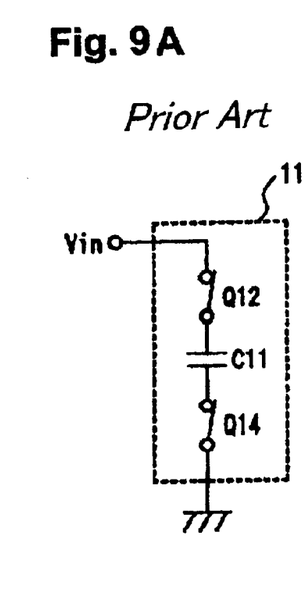
FIGS. 9A and 9B show operations of the DC/DC converter shown in FIG. 8.
Figure 9B:
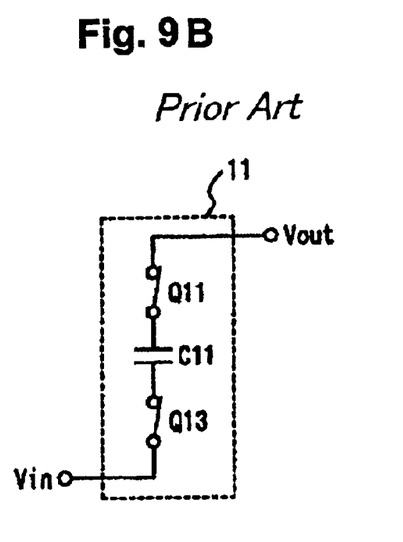

In the second conventional apparatus, the charge pump circuit 11 is placed in a state shown in FIG. 9A in a first period, and in a state shown in FIG. 9B in a second period. The operations in the first period and the second period are alternately repeated.

More specifically, in the first period, in the first charge pump circuit 11, only the MOS transistors Q12 and Q14 are turned on by the driving circuit 12, and a capacitor C11 is charged with an input DC voltage Vin (see FIG. 9A).

On the other hand, in the second period, in the charge pump circuit 11, only the MOS transistors Q11 and Q13 are turned on by the driving circuit 12, and a voltage in which a charged voltage of the capacitor C1 in the first period is added to an input DC voltage Vin becomes to be an output DC voltage Vout (see FIG. 9B).

It is noted that the first conventional apparatus is a complementary driving type, which is effective in reducing output impedance or reducing output ripple, but has an increased current consumption compared to a non-complementary type. Also, there is a problem in that, when the complementary drive is always performed, its conversion efficiency at the time of a low load or no load may be lowered.

Also, in the second conventional apparatus, it is designed taking in account of its maximum load for continuous operation, its output impedance and current consumption remain the same even when the load or input voltage state changes. Consequently, its capacity becomes excessive and is wasted at the time of a light load. In addition, there are problems in that the second conventional apparatus has a greater output ripple compared to the first conventional apparatus of the complementary driving type, and reduction of its impedance is difficult.

Furthermore, in power supply apparatuses for liquid crystal devices using DC/DC converters, it is desired to eliminate wastes in the current consumption, and improve the power conversion efficiency while maintaining an optimized display on a liquid crystal display device.

BRIEF SUMMARY OF THE INVENTION

Accordingly, the present invention may provide a DC/DC converter that maintains a reduced output impedance, improves the efficiency in converting power at the time of a light load or no load, and realizes a higher power conversion efficiency.

The present invention may further provide a DC/DC converter that reduces current consumption at the time of a light load or no load to thereby eliminate wastes in the current consumption.

The present invention may still further provide a power supply apparatus for a liquid crystal device, which maintains an optimized display on a liquid crystal display apparatus, eliminate wastes in the current consumption and realizes a higher efficiency in power conversion.

A DC/DC converter according to one aspect of the present invention comprises:

two charge pump circuits each of which converts a DC input voltage into a given DC output voltage; and two driving circuits driving the two charge pump circuits respectively, wherein in a first mode, the two driving circuits complementarily drive the two charge pump circuits respectively, and the given output voltage is output from each of the two charge pump circuits, and wherein in a second mode, one of the two driving circuits drives one of the two charge pump circuits, and the given output voltage is output from one of the two charge pump circuits and is not output from the other one of the two charge pump circuits.

In this aspect of the invention, two charge pump circuits are, for example, complementarily driven, and the driving of one of the charge pump circuits is controlled according to size of a load or the like. As a result, the low output impedance can be maintained and the efficiency in converting power at the time of a light load can be improved, whereby a higher power conversion efficiency can be realized.

A DC/DC converter according to another aspect of the present invention comprises:

a charge pump circuit which converts a DC input voltage into a given DC output voltage;

a driving circuit which drives the charge pump circuit;

an oscillation circuit which supplies an oscillation output to the driving circuit, wherein the oscillation circuit varies a frequency of the oscillation output according to an operation mode.

In this aspect of the invention, the frequency of the drive signal for the charge pump circuit is varied according to size of a load or the like. As a result, the current consumption at the time of a low load can be reduced, and wastes in the current consumption can be eliminated.

A DC/DC converter according to a further aspect of the present invention comprises:

a charge pump circuit which converts a DC input voltage into a given DC output voltage;

a driving circuit which drives the charge pump circuit;

an oscillation circuit which supplies an oscillation output to the driving circuit, wherein the charge pump circuit comprises:

a first switching circuit which includes a first transistor;

a second switching circuit which includes a second transistor having a smaller capability than the first transistor; and a capacitor which is capable of changing a connecting condition by the first and second switching circuits, wherein the driving circuit uses the first switching circuit to drive the charge pump circuit in a first mode, and uses the second switching circuit to drive the charge pump circuit in a second mode.

In this aspect of the invention, a transistor having a capability required according to size of a load or the like can be used and driven. As a result, the current consumption at the time of a low load can be reduced, and wastes in the current consumption can be eliminated.

A power supply apparatus for a liquid crystal device according to a still further aspect of the present invention comprises:

a first-stage charge pump circuit which converts a DC input voltage into a given DC output voltage;

a first-stage driving circuit which drives the first-stage charge pump circuit;

a series regulator which receives a DC output voltage of the first-stage charge pump circuit as an input voltage, and monitors an output voltage of the series regulator to output a constant voltage;

a second-stage charge pump circuit which steps up the output voltage of the series regulator by a given number of times;

a second-stage driving circuit which drives the second-stage charge pump circuit;

an oscillation circuit which oscillates at a given frequency;

a selection circuit which selects one of an oscillation output from the oscillation circuit and a display signal to be used for displaying on a display apparatus according to a selection signal; and a timing signal generation circuit which generates a given timing signal to be supplied to each of the first-stage driving circuit and the second-stage driving circuit based on a signal that is selected by the selection circuit.

With the power supply apparatus according to this aspect of the invention, an oscillation output from the oscillation circuit or an external signal that has a lower frequency than the oscillation output and used for display on a display apparatus is selected according to size of a load or the like, and each of the charge pump circuits is driven based on the selected signal. As a result, the display of the display apparatus is optimized, wastes in the current consumption are eliminated, and a higher power conversion efficiency can be realized.

DETAILED DESCRIPTION OF THE EMBODIMENT

A DC/DC converter in accordance with a first embodiment of the present invention is described below with reference to FIG. 1.

Figure 1:
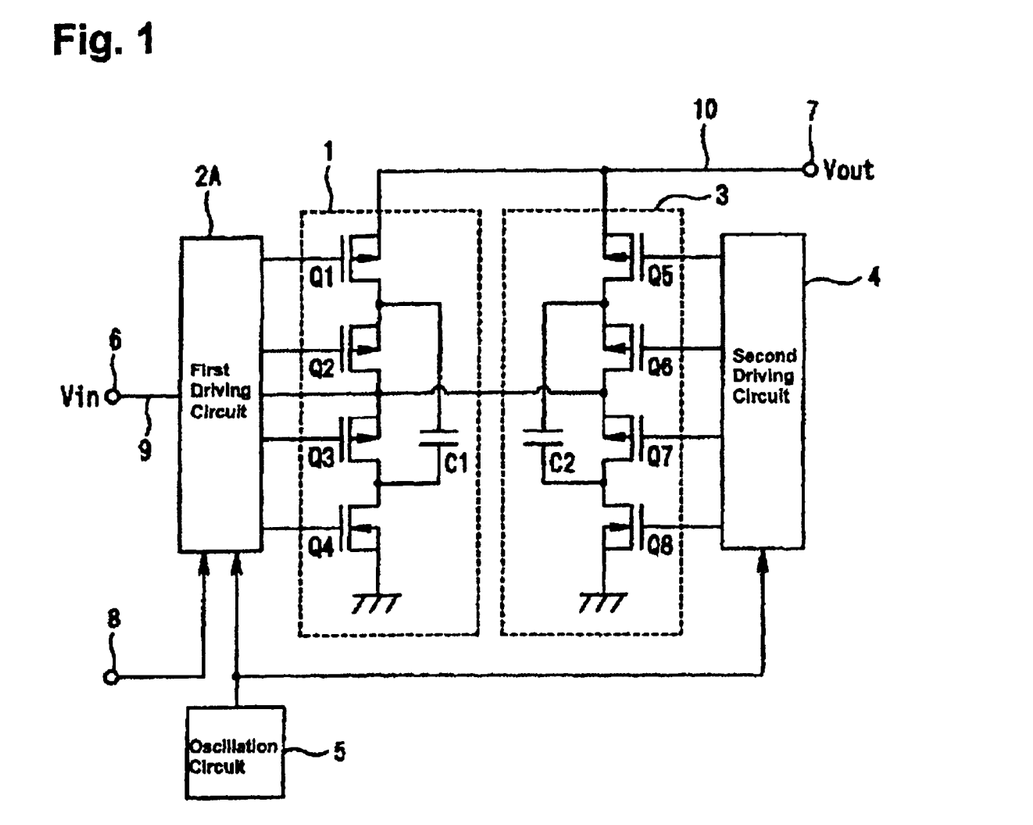
FIG. 1 shows a circuit diagram of a structure of a DC/DC converter in accordance with a first embodiment of the present invention.

As shown in FIG. 1, the DC/DC converter in accordance with the first embodiment is equipped with a double step-up first charge pump circuit 1, a first driving circuit 2A that drives the first charge pump circuit 1, a double step-up second charge pump circuit 3, a second driving circuit 4 that drives the second charge pump circuit 3, an oscillation circuit 5 that oscillates a signal to be supplied to the first driving circuit 2A and the second driving circuit 4, an input terminal 6, an output terminal 7, and a control input terminal 8 in which a signal that controls driving of the first driving circuit 2A is input.

The first charge pump circuit 1 steps up a DC input voltage Vin by two times, and is formed from, as shown in FIG. 1, P-type MOS transistors Q1 to Q3, an N-type MOS transistor Q4 and a capacitor C1.

More concretely, the MOS transistors Q1 to Q4 are serially connected between an output line 10 and a ground. Specified drive signals (control signals) from the first driving circuit 2A are applied to respective gates of the MOS transistors Q1 to Q4, to thereby control to turn them on and off. The capacitor C1 is connected to a common connection section between the MOS transistor Q1 and the MOS transistor Q2 and a common connection section between the MOS transistor Q3 and the MOS transistor Q4. A common connection section between the MOS transistor Q2 and the MOS transistor Q3 is connected to an input line 9.

The second charge pump circuit 3 steps up the DC input voltage Vin by two times, and is formed from, as shown in FIG. 1, P-type MOS transistors Q5 to Q7, an N-type MOS transistor Q8 and a capacitor C2.

More concretely, the MOS transistors Q5 to Q8 are serially connected between the output line 10 and a ground. Specified drive signals from the second driving circuit 4 are applied to respective gates of the MOS transistors Q1 to Q4, to thereby control to turn them on and off. The capacitor C2 is connected to a common connection section between the MOS transistor Q5 and the MOS transistor Q6 and a common connection section between the MOS transistor Q7 and the MOS transistor Q8. A common connection section between the MOS transistor Q6 and the MOS transistor Q7 is connected to the input line 9.

The first driving circuit 2A and the second driving circuit 4 output drive signals that complementarily drive the first charge pump circuit 1 and the second charge pump circuit 3 based on an oscillation signal having a specified frequency oscillated by the oscillation circuit 5.

Accordingly, the specified drive signals from the first driving circuit 2A are applied to the gates of the MOS transistors Q1 to Q4, to thereby controllably drive (control to turn on and off) the MOS transistors Q1 to Q4. Also, the specified drive signals from the second driving circuit 4 are applied to the gates of the MOS transistors Q5 to Q8, to thereby controllably drive the MOS transistors Q5 to Q8.

The first driving circuit 2A stops its operation or outputs therefrom are prohibited based a light load judging signal, an input voltage judging signal or an output voltage judging signal supplied to the control input terminal 8.

Next, operations of the DC/DC converter in accordance with the first embodiment having the structure described above are described with reference to FIG. 1.

The first embodiment is characterized in that the first driving circuit 2A operates, or stops its operation or is prohibited from providing outputs based a light load judging signal, an input voltage judging signal or an output voltage judging signal supplied to the control input terminal 8.

It is noted that the light load judging signal is a signal that is generated according to size of a load on the first embodiment, and becomes to be, for example, an "L" level when the load is large, and an "H" level when the load is small.

Also, an input DC voltage Vin (for example, a voltage of a battery) that is supplied to the input terminal 6 of the first embodiment is detected by an appropriate device. The input voltage judging signal is a signal that becomes to be an "L" level, for example, when the detected voltage is lower than a specified level, and becomes to be an "H" level when the detected voltage is higher than the specified level.

Further, a DC output voltage Vout at the output terminal 7 of the first embodiment is detected by an appropriate device. The output voltage judging signal is a signal that becomes to be an "L" level, for example, when the detected voltage is lower than a specified level, and becomes to be an "H" level when the detected voltage is higher than the specified level.

First, a case in which a light load judging signal is input in the control input terminal 8 is described.

In this case, at the time of a heavy load, there is no margin in the load, and the light load judging signal becomes to be an "L" level. As a result, the first driving circuit 2A is placed in an operation state. Accordingly, the first charge pump circuit 1 is driven by the first driving circuit 2A, and the second charge pump circuit 3 is driven by the second driving circuit 4.

Accordingly, when the load is heavy, the first charge pump circuit 1 and the second charge pump circuit 3 are complimentarily driven (see FIGS. 7A and 7B) in a similar manner as the first charge pump circuit 1 and the second charge pump circuit 3 shown in FIG. 6.

On the other hand, at the time of a light load, there is a margin in the load, and the light load judging signal becomes to be an "H" level. As a result, the first driving circuit 2A is placed in a state in which its operation is stopped, or in a state in which outputs of drive signals therefrom are prohibited. As a result, the driving of the first charge pump circuit 1 is stopped, and only the second charge pump circuit 3 is driven by the second driving circuit 4.

Accordingly, when the load is light, only the second charge pump circuit 3 is non-complementarily driven. This corresponds to the case in which only the second charge pump circuit 3 shown in FIG. 6 is driven (see the right sections of FIGS. 7A and 7B).

Next, a case in which an input voltage judging signal is input in the control input terminal 8 is described In this case, for example, when an input DC voltage Vin of a battery that is input in the input terminal 6 is greater than a specified value, the input DC voltage Vin has a margin, and the input voltage judging signal becomes to be an "H" level, whereby the first driving circuit 2A is placed in a state in which its operation is stopped, or in a state in which outputs of drive signals therefrom are prohibited. Accordingly, the first charge pump circuit 1 stops its operation, and only the second charge pump circuit 3 is driven by the second driving circuit 4.

On the other hand, when the input DC voltage Vin becomes lower than the specified value as the battery is used, the input DC voltage Vin does not have a margin, and the input voltage judging signal becomes to be an "L" level, whereby the first driving circuit 2A is placed in an operation state. Accordingly, the first charge pump circuit 1 is driven by the first driving circuit 2A, and the second charge pump circuit 3 is driven by the second driving circuit 4.

Furthermore, a case in which an output voltage judging signal is input in the control input terminal 8 is described In this case, when an output DC voltage Vout at the output terminal 7 is greater than a specified value, the output DC voltage Vout has a margin, and the output voltage judging signal becomes to be an "H" level, whereby the first driving circuit 2A is placed in a state in which its operation is stopped, or in a state in which outputs of drive signals therefrom are stopped. Accordingly, the first charge pump circuit 1 stops its operation, and only the second charge pump circuit 3 is driven by the second driving circuit 4.

On the other hand, when the output DC voltage Vout becomes lower than the specified value, the output DC voltage Vout does not have a margin, and the output voltage judging signal becomes to be an "L" level, whereby the first driving circuit 2A is placed in an operation state. Accordingly, the first charge pump circuit 1 is driven by the first driving circuit 2A, and the second charge pump circuit 3 is driven by the second driving circuit 4.

As described above, by the DC/DC converter in accordance with the first embodiment, the first and second charge pump circuits 1 and 3 can be complementarily driven, and the driving of the first charge pump circuit 1 is controlled according to size of a load, size of an input voltage or size of an output voltage. As a result, a reduced output impedance can be maintained and the efficiency in converting power at the time of a light load can be improved, whereby a higher power conversion efficiency can be realized.

It is noted that, in accordance with the first embodiment, only the first charge pump circuit 1 is controllably driven according to size of a load or the like. However, instead of this, the first charge pump circuit 1 and the second charge pump circuit 3 may be controlled to drive according to size of a load or the like.

Next, a DC/DC converter in accordance with a second embodiment of the present invention is described with reference to FIG. 2.

Figure 2:
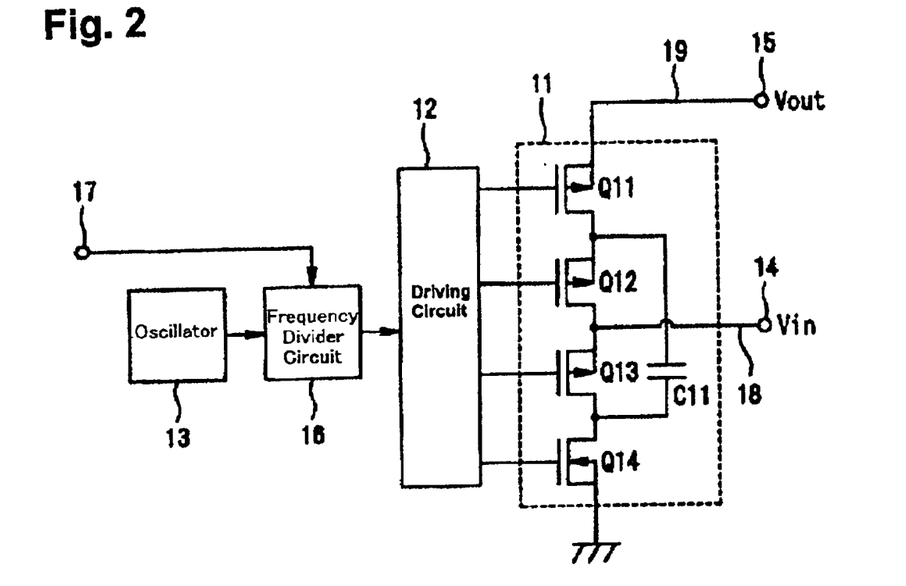
FIG. 2 shows a circuit diagram of a structure of a DC/DC converter in accordance with a second embodiment of the present invention.

As shown in FIG. 2, the DC/DC converter in accordance with the second embodiment is equipped with a double step-up charge pump circuit 11, a driving circuit 12 that drives the charge pump circuit 11, an oscillator 13 that oscillates a signal to be supplied to the driving circuit 12, a frequency divider circuit 16 that divides an output of the oscillator 13, an input terminal 14, an output terminal 15, and a control input terminal 17 in which a signal that controls the division by the frequency divider circuit 16 is input. The oscillator 13 and the frequency divider circuit 16 form an oscillation circuit that is capable of changing the oscillation frequency.

The charge pump circuit 11 steps up a DC input voltage Vin by two times, and is formed from, as shown in FIG. 2, P-type MOS transistors Q11 to Q13, an N-type MOS transistor Q14 and a capacitor C11.

More concretely, the MOS transistors Q11 to Q14 are serially connected between an output line 19 and a ground. Specified drive signals from the driving circuit 12 are applied to respective gates of the MOS transistors Q11 to Q14, to thereby control to turn them on and off. The capacitor C11 is connected to a common connection section between the MOS transistor Q11 and the MOS transistor Q12 and a common connection section between the MOS transistor Q13 and the MOS transistor Q14. A common connection section between the MOS transistor Q12 and the MOS transistor Q13 is connected to an input line 18.

The driving circuit 12 generates drive signals to control and drive the MOS transistors Q11 to Q14 based on an output signal from the frequency divider circuit 16, wherein the drive signals are applied to respective gates of the MOS transistors Q11 to Q14.

The oscillator 13 oscillates a signal at a specified frequency, and supplies its oscillation signal to the frequency divider circuit 16.

The frequency divider circuit 16 is provided between the oscillator 13 and the driving circuit 12, and passes an oscillation output of the oscillator 13 undivided, or divides the frequency of an oscillation output into 1/N thereof to reduce the frequency based on a light load judging signal, an input voltage judging signal or an output voltage judging signal that is supplied to the control terminal 17.

Next, operations of the DC/DC converter in accordance with the second embodiment having the structure described above are described with reference to FIG. 2.

The second embodiment is characterized in that an oscillation output of the oscillator 13 is divided by the frequency divider circuit 16 based on a light load judging signal, an input voltage judging signal or an output voltage judging signal that is supplied to the control terminal 17, to thereby vary the frequency of the drive signal for the driving circuit 12, whereby the charge pump circuit 11 is driven.

First, a case in which a light load judging signal is input in the control input terminal 17 is described.

In this case, at the time of a heavy load, there is no margin in the load, and the light load judging signal becomes to be an "L" level. As a result, the frequency divider circuit 16 does not perform an operation to divide an output from the oscillator 13. As a consequence, an oscillation output of the oscillator 13 is supplied unchanged to the driving circuit 12, and therefore the charge pump circuit 11 is driven by the frequency of the oscillation output.

It is noted that the driving circuit 12 drives the charge pump circuit 11 (see FIGS. 9A and 9B) in a similar manner as the driving circuit 12 shown in FIG. 8.

On the other hand, at the time of a light load, there is a margin in the load, and the light load judging signal becomes to be an "H" level. As a result, the frequency divider circuit 16 divides the frequency of an oscillation output of the oscillator 13 into a level equivalent to 1/N thereof, in other words, reduces its output frequency, and supplies the same to the driving circuit 12. As a result, the charge pump circuit 11 is driven by the divided frequency. Next, a case in which an input voltage judging signal is input in the control input terminal 17 is described.

In this case, when an input DC voltage Vin that is supplied to the input terminal 14 is greater than a specified level, there is a margin in the input DC voltage Vin, and the input voltage judging signal becomes to be an "H" level. As a result, the frequency divider circuit 16 divides the frequency of an output of the oscillator 13 into a level equivalent to 1/N thereof, in other words, reduces its output frequency, and supplies the same to the driving circuit 12. As a result, the charge pump circuit 11 is driven by the divided frequency.

On the other hand, when the input DC voltage Vin becomes lower than the specified value, there is no margin in the input DC voltage Vin, and the input voltage judging signal becomes to be an "L" level. As a result, the frequency divider circuit 16 does not perform an operation to divide an oscillation output from the oscillator 13. As a consequence, an oscillation output of the oscillator 13 is supplied unchanged to the driving circuit 12, and therefore the charge pump circuit 11 is driven by the frequency of the oscillation output from the oscillator 13.

Next, a case in which an output voltage judging signal is input in the control input terminal 17 is described.

In this case, when a DC output voltage Vout at the output terminal 15 is greater than a specified level, there is a margin in the DC output voltage Vout, and the output voltage judging signal becomes to be an "H" level. As a result, the frequency divider circuit 16 divides the frequency of an oscillation output of the oscillator 13 into a level equivalent to 1/N thereof, and supplies the same to the driving circuit 12. As a result, the charge pump circuit 11 is driven by the divided frequency.

On the other hand, when the output DC voltage Vout becomes lower than the specified value, there is no margin in the DC output voltage Vout, and the output voltage judging signal becomes to be an "L" level. As a result, the frequency divider circuit 16 does not perform an operation to divide an oscillation output from the oscillator 13. As a consequence, an oscillation output of the oscillator 13 is supplied unchanged to the driving circuit 12, and therefore the charge pump circuit 11 is driven by the frequency of the oscillation output from the oscillator 13.

As described above, in the DC/DC converter in accordance with the second embodiment, the frequency of a drive signal for the charge pump circuit 11 is controlled according to size of a load, size of an input voltage or size of an output voltage. As a result, current consumption at the time of a light load can be reduced and wastes in the current consumption can be eliminated.

Next, a DC/DC converter in accordance with a third embodiment of the present invention is described with reference to FIG. 3.

Figure 3:
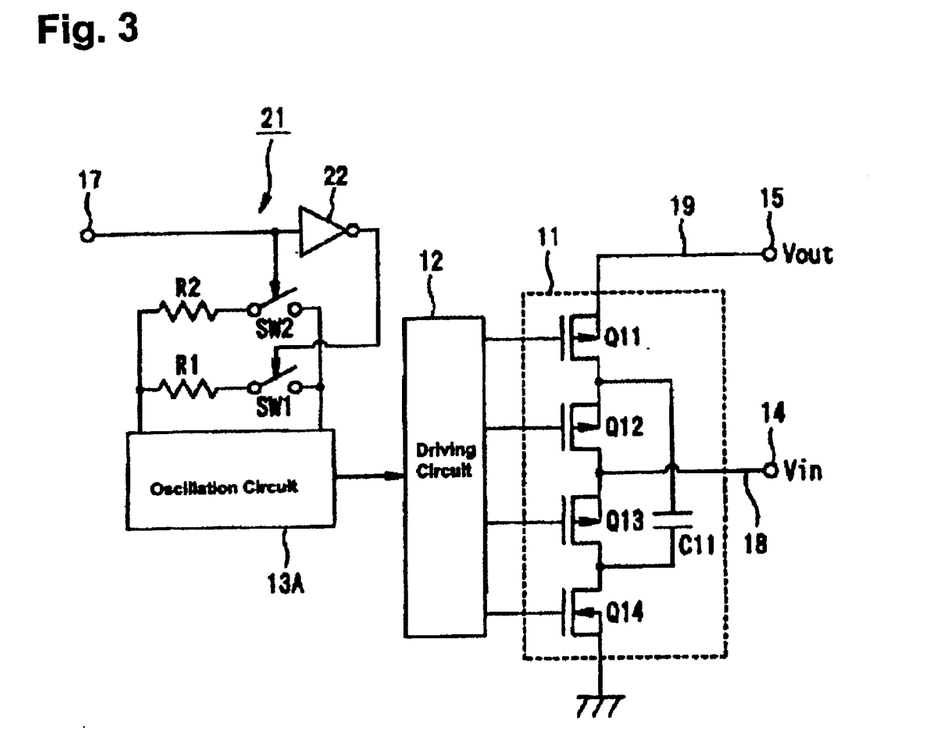
FIG. 3 shows a circuit diagram of a structure of a DC/DC converter in accordance with a third embodiment of the present invention.

As shown in FIG. 3, the DC/DC converter in accordance with the third embodiment is equipped with a double step-up charge pump circuit 11, a driving circuit 12 that drives the charge pump circuit 11, an oscillation circuit 13A that oscillates a signal to be supplied to the driving circuit 12, a frequency variable circuit 21 that varies an oscillation frequency of the oscillation circuit 13A, an input terminal 14, an output terminal 15, and a control input terminal 17 for inputting an external signal to the frequency variable circuit 21.

The charge pump circuit 11 and the driving circuit 12 of the third embodiment are the same as the charge pump circuit 11 and the driving circuit 12 of the second embodiment shown in FIG. 2, and therefore the description of their structures is omitted, and other portions having different structures are described.

The oscillation circuit 13A is formed from, for example, a CR oscillation circuit, and includes, for changing its oscillation frequency, a resistor R1 for generating a high frequency and a resistor R2 for generating a low frequency. Further, the resistor R1 is serially connected to a switch SW1 to form a first serial circuit and the resistor R2 is serially connected to a switch SW2 to form a second serial circuit, and these two serial circuits are connected in parallel with the oscillation circuit 13A.

The frequency variable circuit 21 is formed from the switches SW1 and SW2 described above and an inverter 22. In other words, the switch SW2 is controlled to open and close by an input signal on the control input terminal 17, and the switch SW1 is controlled to open and close by a signal obtained by inverting the input signal by the inverter 22.

Next, operations of the DC/DC converter in accordance with the third embodiment having the structure described above are described with reference to FIG. 3.

The third embodiment is characterized in that an oscillation frequency of the oscillation circuit 13A is varied based on a light load judging signal, an input voltage judging signal or an output voltage judging signal that is supplied to the control terminal 17.

First, a case in which a light load judging signal is input in the control input terminal 17 is described. In this case, at the time of a heavy load, there is no margin in the load, and the light load judging signal becomes to be an "L" level, which is inverted by the inverter 22 to become an "H" level. By this, the switch SW1 closes such that the resistor R1 for generating a high frequency is selected. As a result, the oscillation circuit 13A oscillates at a high frequency, and the driving circuit 12 drives the charge pump circuit 11 based on this oscillation output.

It is noted that the driving circuit 12 drives the charge pump circuit 11 (see FIGS. 9A and 9B) in a similar manner as the driving circuit 12 shown in FIG. 8.

On the other hand, at the time of a light load, there is a margin in the load, and the light load judging signal becomes to be an "H" level, which is inverted by the inverter 22 to become an "L" level. By this, the switch SW1 opens and the switch SW2 closes such that the resistor R2 for generating a low frequency is selected. As a result, the oscillation circuit 13A oscillates at a low frequency, and the driving circuit 12 drives the charge pump circuit 11 based on the oscillation output.

Next, a case in which an input voltage judging signal is input in the control input terminal 17 is described.

In this case, when an input DC voltage Vin that is supplied to the input terminal 14 is greater than a specified level, there is a margin in the input DC voltage Vin, and the input voltage judging signal becomes to be an "H" level. As a result, the switch SW2 closes such that the resistor R2 for generating a low frequency is selected. As a result, the oscillation circuit 13A oscillates at a low frequency, and the driving circuit 12 drives the charge pump circuit 11 based on the oscillation output.

On the other hand, when the input DC voltage Vin becomes lower than the specified value, there is no margin in the input DC voltage Vin, and the input voltage judging signal becomes to be an "L" level, which is inverted by the inverter 22 to become an "H" level. By this, the switch SW2 opens and the switch SW1 closes such that the resistor R1 for generating a high frequency is selected. As a result, the oscillation circuit 13A oscillates at a high frequency, and the driving circuit 12 drives the charge pump circuit 11 based on the oscillation output.

Next, a case in which an output voltage judging signal is input in the control input terminal 17 is described.

In this case, when a DC output voltage Vout at the output terminal 15 is greater than a specified level, there is a margin in the DC output voltage Vout, and the output voltage judging signal becomes to be an "H" level. As a result, the switch SW2 closes such that the resistor R2 for generating a low frequency is selected. As a result, the oscillation circuit 13A oscillates at a low frequency, and the driving circuit 12 drives the charge pump circuit 11 based on the oscillation output.

On the other hand, when the output DC voltage Vout becomes lower than the specified value, there is no margin in the DC output voltage Vout, and the output voltage judging signal becomes to be an "L" level, which is inverted by the inverter 22 to become an "H" level. By this, the switch SW2 opens and the switch SW1 closes such that the resistor R1 for generating a high frequency is selected. As a result, the oscillation circuit 13A oscillates at a high frequency, and the driving circuit 12 drives the charge pump circuit 11 based on the oscillation output.

As described above, in the DC/DC converter in accordance with the third embodiment, an oscillation frequency of the oscillation circuit 13A is controlled according to size of a load, size of an input voltage or size of an output voltage. As a result, current consumption at the time of a light load can be reduced and wastes in the current consumption can be eliminated.

Next, a DC/DC converter in accordance with a fourth embodiment of the present invention is described with reference to FIG. 4.

Figure 4:
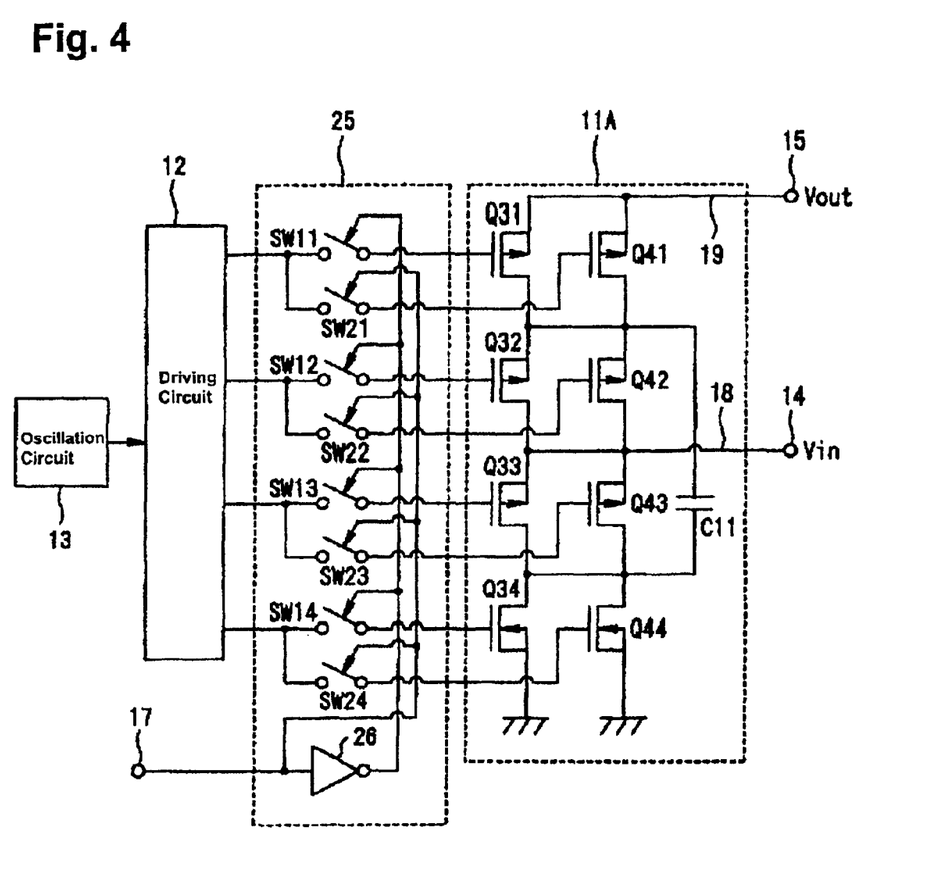
FIG. 4 shows a circuit diagram of a structure of a DC/DC converter in accordance with a fourth embodiment of the present invention.

As shown in FIG. 4, the DC/DC converter in accordance with the fourth embodiment is equipped with a double step-up charge pump circuit 11A, a driving circuit 12 that drives the charge pump circuit 11A, an oscillator 13 that oscillates a signal to be supplied to the driving circuit 12, a selection circuit 25 that is disposed between the driving circuit 12 and the charge pump circuit 11A, an input terminal 14, an output terminal 15, and a control input terminal 17 for inputting an external signal to the selection circuit 25.

The driving circuit 12 and the oscillator 13 of the fourth embodiment are the same as the driving circuit 12 and the oscillator 13 of the second embodiment shown in FIG. 2, and therefore the description of their structures is omitted, and other portions having different structures are described.

The charge pump circuit 11A steps up a DC input voltage Vin by two times, and is formed from, for example, a first charge pump circuit composed of MOS transistors Q31 to Q34 with a large transistor size, a second charge pump circuit composed of MOS transistors Q41 to Q44 with a transistor size smaller than that of the MOS transistors Q31 to Q34, and a capacitor C11 that is commonly used by both of the circuits.

More concretely, the MOS transistors Q31 to Q34 are serially connected between an output line 19 and a ground. The MOS transistors Q41 to Q44 are connected in parallel to the corresponding respective MOS transistors Q31 to Q34. The capacitor C11 is connected to a common connection section between the MOS transistor Q31 and the MOS transistor Q32 and a common connection section between the MOS transistor Q33 and the MOS transistor Q34. A common connection section between the MOS transistor Q32 and the MOS transistor Q33 is connected to an input line 18.

Specified drive signals from the driving circuit 12 are applied to respective gates of the MOS transistors Q31 to Q34 through corresponding respective switches SW11 to SW14 in the selection circuit 25, to thereby control to turn them on and off. Also, the same drive signals are applied to respective gates of the MOS transistors Q41 to Q44 through corresponding respective switches SW21 to SW24 in the selection circuit 25, to thereby control to turn them on and off.

As shown in FIG. 4, the selection circuit 25 is formed from the switches SW11 to SW14, the switches SW21 to SW24 and an inverter 26. More specifically, the switches SW21 to SW24 are controlled to open and close by a signal that is input in the control input terminal 17, and the switches SW11 to SW14 are controlled to open and close by a signal that is provided by inverting the signal by the inverter 26.

Next, operations of the DC/DC converter in accordance with the fourth embodiment having the structure described above are described with reference to FIG. 4.

The fourth embodiment is characterized in that the MOS transistors Q31 to Q34 and the MOS transistors Q41 to Q44, which have different sizes in the charge pump circuit 11A, are selectively operated based on a light load judging signal, an input voltage judging signal or an output voltage judging signal that is supplied to the control terminal 17.

First, a case in which a light load judging signal is input in the control input terminal 17 is described. In this case, when the load is heavy, there is no margin in the load, and the light load judging signal becomes to be an "L" level, which is inverted by the inverter 26 to become an "H" level. By this, the switches SW11 to SW14 close. As a result, the driving circuit 12 drives the large size MOS transistors Q31 to Q34 in the charge pump circuit 11A. At this moment, the switches SW21 to SW24 are in an open state, and therefore the corresponding MOS transistors Q41 to Q44 are in an off state.

On the other hand, when the load is light, there is a margin in the load, and the light load judging signal becomes to be an "H" level, which is inverted by the inverter 26 to become an "L" level. By this, the switches SW11 to SW14 open and the switches SW21 to SW24 close. As a result, the driving circuit 12 drives the small size MOS transistors Q41 to Q44 in the charge pump circuit 11A. At this moment, the switches SW11 to SW14 are in an open state, and therefore the corresponding MOS transistors Q31 to Q34 are in an off state.

It is noted that operations of the MOS transistors Q31 to Q34 or those of the MOS transistors Q41 to Q44 (see FIGS. 9A and 9B) are the same as those of the MOS transistors Q11 to Q14 shown in FIG. 8.

Next, a case in which an input voltage judging signal is input in the control input terminal 17 is described.

In this case, when an input DC voltage Vin that is supplied to the input terminal 14 is greater than a specified level, there is a margin in the input DC voltage Vin, and the input voltage judging signal becomes to be an "H" level, such that the switches SW21 to SW24 close. As a result, the driving circuit 12 drives the small size MOS transistors Q41 to Q44 in the charge pump circuit 11A.

When the input DC voltage Vin becomes lower than the specified value, there is no margin in the input DC voltage Vin, and the input voltage judging signal becomes to be an "L" level, which is inverted by the inverter 26 to become an "H" level. By this, the switches SW21 to SW24 open and the switches SW11 to SW14 close. As a result, the driving circuit 12 drives the large size MOS transistors Q31 to Q34 in the charge pump circuit 11A.

Next, a case in which an output voltage judging signal is input in the control input terminal 17 is described. In this case, when a DC output voltage Vout at the output terminal 15 is greater than a specified level, there is a margin in the DC output voltage Vout, and the output voltage judging signal becomes to be an "H" level. As a result, the switches SW21 to SW24 close. As a result, the driving circuit 12 drives the small size MOS transistors Q41 to Q44 in the charge pump circuit 11A.

On the other hand, when the output DC voltage Vout becomes lower than the specified value, there is no margin in the DC output voltage Vout, and the output voltage judging signal becomes to be an "L" level, which is inverted by the inverter 26 to become an "H" level. By this, the switches SW21 to SW24 open and the switches SW11 to SW14 close. As a result, the driving circuit 12 drives the large size MOS transistors Q31 to Q34 in the charge pump circuit 11A.

As described above, in the DC/DC converter in accordance with the fourth embodiment, the MOS transistors Q31 to Q34 and the MOS transistors Q41 to Q44, which have different sizes in the charge pump circuit 11A, are selectively operated according to size of a load, size of an input voltage or size of an output voltage. As a result, current consumption at the time of a light load can be reduced and wastes in the current consumption can be eliminated.

Next, a power supply apparatus for liquid crystal devices in accordance with the present invention is described with reference to FIG. 5.

Figure 5:
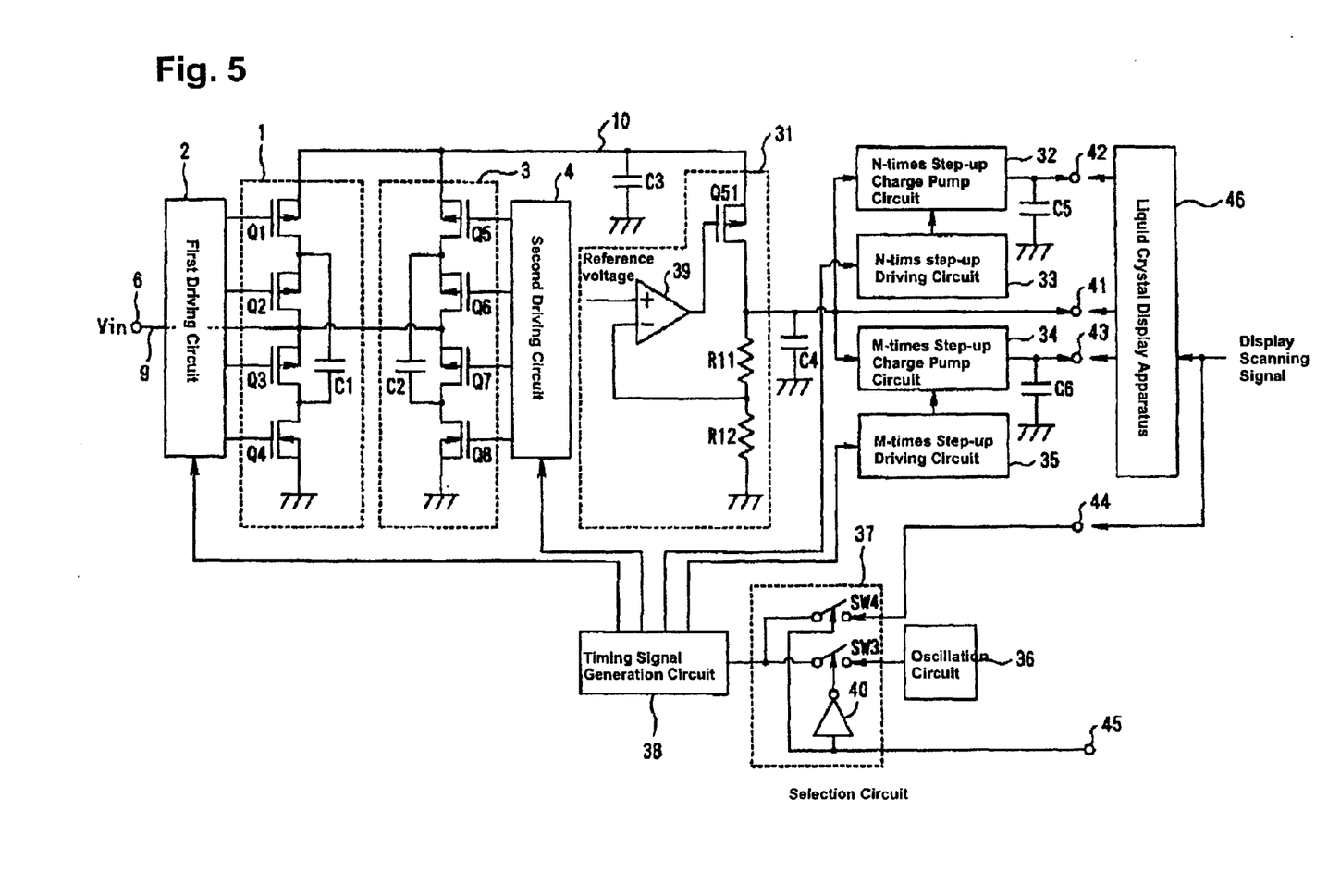
FIG. 5 shows a circuit diagram of a structure of a power supply apparatus for liquid crystal devices.

As shown in FIG. 5, the power supply apparatus for liquid crystal devices of the present invention is equipped with at least a double step-up first charge pump circuit 1, a first driving circuit 2, a double step-up second charge pump circuit 3, a second driving circuit 4, a series regulator 31, an n-times step-up charge pump circuit 32, an n-times step-up driving circuit 33, an m-times step-up charge pump circuit 34, an m-times step-up driving circuit 35, an oscillation circuit 36, a selection circuit 37, and a timing signal generation circuit 38. For example, a display apparatus such as a liquid crystal display device 46 or the like becomes to be a load therefore.

The first charge pump circuit 1 and the second charge pump circuit 3 are complementarily driven by the corresponding first driving circuit 2 and the second driving circuit 4, and step up a DC input voltage Vin that is input in an input terminal 6 by two times and output the same.

The series regulator 31 takes a DC output voltage of the first charge pump circuit 1 and the second charge pump circuit 3 as an input voltage, and monitors an output voltage of itself to thereby output a constant voltage, wherein an output voltage therefrom can be taken out from an output terminal 41.

In other words, the series regulator 31 is formed from, as shown in FIG. 5, a MOS transistor 51, two resistors R11 and R12 for detecting its own output voltage, and a comparator circuit 39. In the series regulator 31, the comparator circuit 39 compares a part of its own output voltage (a divided voltage obtained by the resistors R11 and R12) with a reference voltage, and the MOS transistor Q51 is controlled to turn on and off according to a result of the comparison, whereby a specified output voltage is obtained.

The n-times step-up charge pump circuit 32 steps up an output voltage of the series regulator 31 by n times, and the stepped up voltage can be taken out from an output terminal 42. The n-times step-up driving circuit 33 drives the charge pump circuit 32.

The m-times step-up charge pump circuit 34 steps up an output voltage of the series regulator 31 by n times, and the stepped up voltage can be taken out from an output terminal 43. The n-times step-up driving circuit 35 drives the charge pump circuit 32.

The oscillation circuit 36 is a circuit that oscillates a signal having a frequency higher than a frequency of a display scanning signal that is supplied to the liquid crystal display device 46.

The selection circuit 37 is a circuit that selects an oscillation output of the oscillation circuit 36 or the display scanning signal that is input in the input terminal 44 according to a selection signal that is input in the control input terminal 45. In other words, the selection circuit 37 is equipped with a switch SW3 that selects the oscillation output of the oscillation circuit 36 and conducts the same to a timing signal generation circuit 38, and a switch SW4 that selects the display scanning signal and conducts the same to the circuit 38. The switch SW3 is controlled to open and close by a signal that is provided by inverting a selection signal input in the control input terminal 45 by an inverter 40, and the switch SW4 is controlled to open and close by the selection signal.

The timing signal generation circuit 38 is a circuit that generates a timing signal for generating drive signals of the respective driving circuits 2, 4, 33 and 35 that drive the charge pump circuits 1, 3, 32 and 34, respectively, based on the oscillation output of the oscillation circuit 36 or the display scanning signal input in the input terminal 44, which is selected by the selection circuit 37.

It is noted that FIG. 5 shows capacitors C3 to C6 that are connected between predetermined locations in FIG. 5 and a ground.

Next, operations of the power supply apparatus for liquid crystal devices in accordance with the present embodiment having the structure described above are described with reference to FIG. 5.

The present embodiment is characterized in that the selection circuit 37 selects an oscillation output of the oscillation circuit 36 or a display scanning signal that is input in the input terminal 44 based on a selection signal (a light load judging signal, an input voltage judging signal or an output voltage judging signal) that is supplied to the control input terminal 45, and each of the charge pump circuits 1, 3, 32 and 34 is driven based on the selected signal.

First, a case in which a light load judging signal is input in the control input terminal 45 is described.

In this case, when the load is heavy, there is no margin in the load, and the light load judging signal becomes to be an "L" level, which is inverted by the inverter 40 to become an "H" level, whereby the switch SW3 closes. By this, the timing signal generation circuit 38 generates a timing signal based on an oscillation output of the oscillation circuit 36. Based on this, the driving circuits 2, 4, 33 and 35 drive the respective corresponding charge pump circuits 1, 3, 32 and 34. Accordingly, each of the charge pump circuits 1, 3, 32 and 34 is driven by an oscillation frequency of the oscillation circuit 36.

On the other hand, when the load is light, there is a margin in the load, and the light load judging signal becomes to be an "H" level, which is inverted by the inverter 40 to become an "L" level. By this, the timing signal generation circuit 38 generates a timing signal based on a display scanning signal that has a lower frequency than a frequency of the oscillation output of the oscillation circuit 36. Based on this, the driving circuits 2, 4, 33 and 35 drive the respective corresponding charge pump circuits 1, 3, 32 and 34. Accordingly, each of the charge pump circuits 1, 3, 32 and 34 is driven by a frequency of the display scanning signal.

Next, a case in which an input voltage judging signal is input in the control input terminal 45 is described. In this case, when an input DC voltage Vin that is supplied to the input terminal 6 is greater than a specified level, there is a margin in the input DC voltage Vin, and the input voltage judging signal becomes to be an "H" level, such that the switch SW4 closes. As a result, the timing signal generation circuit 38 generates a timing signal based on a display scanning signal. Based on this, the driving circuits 2, 4, 33 and 35 drive the respective corresponding charge pump circuits 1, 3, 32 and 34.

On the other hand, when the input DC voltage Vin becomes lower than the specified value, there is no margin in the input DC voltage Vin, and the input voltage judging signal becomes to be an "L" level, which is inverted by the inverter 40 to become an "H" level. By this, the switch SW4 opens and the switch SW3 closes. As a result, the timing signal generation circuit 38 generates a timing signal based on the oscillation output of the oscillation circuit 36. Based on this, the driving circuits 2, 4, 33 and 35 drive the respective corresponding charge pump circuits 1, 3, 32 and 34.

Next, a case in which an output voltage judging signal is input in the control input terminal 45 is described. In this case, for example, when a DC output voltage Vout at the output terminal 41 is greater than a specified level, there is a margin in the DC output voltage Vout, and the output voltage judging signal becomes to be an "H" level, such that the switch SW4 closes. As a result, the timing signal generation circuit 38 generates a timing signal based on the display scanning signal. Based on this, the driving circuits 2, 4, 33 and 35 drive the respective corresponding charge pump circuits 1, 3, 32 and 34.

On the other hand, when the output DC voltage Vout becomes lower than the specified value, there is no margin in the DC output voltage Vout, and the output voltage judging signal becomes to be an "L" level, which is inverted by the inverter 40 to become an "H" level, such that the switch SW4 opens and the switch SW3 closes. As a result, the timing signal generation circuit 38 generates a timing signal based on the oscillation output of the oscillation circuit 36. Based on this, the driving circuits 2, 4, 33 and 35 drive the respective corresponding charge pump circuits 1, 3, 32 and 34.

As described above, in the power supply apparatus for liquid crystal devices in accordance with the present embodiment, an oscillation output of the oscillation circuit 36 or a display scanning signal that is input in the input terminal 44 is selected according to size of a load, size of an input voltage or size of an output voltage, and each of the charge pump circuits 1, 3, 32 and 34 is driven based on the selected signal. As a result, display on a display apparatus such as liquid crystal display apparatus is optimized, wastes in the current consumption can be eliminated, and a higher power conversion efficiency is achieved.

What is claimed is:

1. A DC/DC converter comprising:
    two charge pump circuits each of which converts a DC input voltage into a given DC output voltage; and
    two driving circuits driving the two charge pump circuits respectively;
    a control input terminal connected to at least one of the two driving circuits, wherein the control input terminal receives a mode signal that indicates one of a first mode and a second mode,
        wherein in a the first mode, the two driving circuits complementarily drive the two charge pump circuits respectively, and the given output voltage is output from each of the two charge pump circuits, and
        wherein in the second mode, one of the two driving circuits drives one of the two charge pump circuits, and the given output voltage is output from one of the two charge pump circuits and is not output from the other one of the two charge pump circuits.

2. The DC/DC converter as defined in claim 1, wherein the other one of the two charge pump circuits stops an operation thereof in the second mode.

3. The DC/DC converter as defined in claim 1, wherein the first mode is set when a load connected to each of the two charge pump circuits is large, and the second mode is set when the load is small.

4. The DC/DC converter as defined in claim 1, wherein the first mode is set when the DC input voltage is low, and the second mode is set when the DC input voltage is high.

5. The DC/DC converter as defined in claim 1, wherein the first mode is set when the DC output voltage is low, and the second mode is set when the DC output voltage is high.

6. A DC/DC converter comprising:
    a charge pump circuit which converts a DC input voltage into a given DC output voltage;
    a driving circuit which drives the charge pump circuit;
    an oscillation circuit which supplies an oscillation output to the driving circuit,
    wherein the charge pump circuit comprises:
        a first switching circuit which includes a first transistor;
        a second switching circuit which includes a second transistor having a smaller current driving ability than the first transistor; and
        a capacitor which is capable of changing a connecting condition by the first and second switching circuits,
        wherein the driving circuit uses the first switching circuit to drive the charge pump circuit in a first mode, and uses the second switching circuit to drive the charge pump circuit in a second mode.

7. The DC/DC converter as defined in claim 6, comprising a control input terminal in which a signal indicating the second mode is input.

8. The DC/DC converter as defined in claim 6, wherein the first mode is set when a load connected to the charge pump circuit is large, and the second mode is set when the load is small.

9. The DC/DC converter as defined in claim 6, wherein the first mode is set when the DC input voltage is low, and the second mode is set when the DC input voltage is high.

10. The DC/DC converter as defined in claim 6, wherein the first mode is set when the DC output voltage is low, and the second mode is set when the DC output voltage is high.

11. A power supply apparatus for a liquid crystal device, comprising:
    a first-stage charge pump circuit which converts a DC input voltage into a given DC output voltage;
    a first-stage driving circuit which drives the first-stage charge pump circuit;
    a series regulator which receives a DC output voltage of the first-stage charge pump circuit as an input voltage, and monitors an output voltage of the series regulator to output a constant voltage;
    a second-stage charge pump circuit which steps up the output voltage of the series regulator by a given number of times;
    a second-stage driving circuit which drives the second-stage charge pump circuit;
    an oscillation circuit which oscillates at a given frequency;
    a selection circuit which selects one of an oscillation output from the oscillation circuit and a display signal to be used for displaying on a display apparatus according to a selection signal; and
    a timing signal generation circuit which generates a given timing signal to be supplied to each of the first-stage driving circuit and the second-stage driving circuit based on a signal that is selected by the selection circuit.

12. The power supply apparatus for a liquid crystal device as defined in claim 11, wherein the display signal is a display scanning signal that is used for displaying on a liquid crystal display device.

13. The power supply apparatus for a liquid crystal device as defined in claim 11, comprising an input terminal in which the display signal and the selection signal are input.

14. The power supply apparatus for a liquid crystal device as defined in claim 11, wherein the selection circuit selects an oscillation output of the oscillation circuit when a load connected to the second-stage charge pump circuit is large, and selects the display signal when the load is small.

15. The power supply apparatus for a liquid crystal device as defined in claim 11, wherein the selection circuit selects an oscillation output of the oscillation circuit when the DC input voltage is low, and selects the display signal when the DC input voltage is high.

16. The power supply apparatus for a liquid crystal device as defined in claim 11, wherein the selection circuit selects an oscillation output of the oscillation circuit when an output voltage of any one of the first-stage charge pump circuit, the series regulator, and the second-stage charge pump circuit is low, and selects the display signal when the output voltage of any one of the first-stage charge pump circuit, the series regulator, and the second-stage charge pump circuit is high.

17. A DC/DC converter comprising:
  a charge pump circuit which converts a DC input voltage into a given DC output voltage;
  a driving circuit which drives the charge pump circuit;
  an oscillation circuit which supplies an oscillation output to the driving circuit,
  wherein the oscillation circuit sets a frequency of the oscillation output higher in a first mode, and sets a frequency of the oscillation output lower in a second mode, and further wherein the first mode is set when a load connected to the charge pump circuit is large and the second mode is set when the load is small.

18. The DC/DC converter as defined in claim 17, comprising a control input terminal in which a signal indicating the second mode is input.

19. The DC/DC converter as defined in claim 17, wherein the first mode is set when the DC input voltage is low, and the second mode is set when the DC input voltage is high.

20. The DC/DC converter as defined in claim 17, wherein the first mode is set when the DC output voltage is low, and the second mode is set when the DC output voltage is high.

* * * * *